United States Patent
Hulse

[19]

[11] Patent Number: 6,164,805
[45] Date of Patent: Dec. 26, 2000

[54] ILLUMINATED DOOR HANDLE FOR A VEHICLE

[75] Inventor: George R. Hulse, Cookeville, Tenn.

[73] Assignee: Federal-Mogul World Wide, Inc., Southfield, Mich.

[21] Appl. No.: 09/168,890

[22] Filed: Oct. 9, 1998

Related U.S. Application Data

[63] Continuation-in-part of application No. 09/062,766, Apr. 20, 1998.

[51] Int. Cl.$^7$ ..................................................... B60Q 1/00
[52] U.S. Cl. ............................................. 362/501; 362/511
[58] Field of Search ................................. 362/501, 100, 362/511

[56] References Cited

U.S. PATENT DOCUMENTS

| | | |
|---|---|---|
| Re. 33,722 | 10/1991 | Scifres et al. . |
| 2,308,844 | 1/1943 | Wilshusen .............................. 362/501 X |
| 3,832,028 | 8/1974 | Kapron . |
| 3,901,581 | 8/1975 | Thiel . |
| 4,788,630 | 11/1988 | Gavagan .................................. 362/501 |
| 4,824,194 | 4/1989 | Karasawa . |
| 4,885,663 | 12/1989 | Parker . |
| 4,907,132 | 3/1990 | Parker . |
| 5,005,108 | 4/1991 | Pristash et al. . |
| 5,042,892 | 8/1991 | Chiu et al. . |
| 5,136,480 | 8/1992 | Pristash et al. . |
| 5,199,091 | 3/1993 | Davenport et al. . |
| 5,297,010 | 3/1994 | Camarota et al. ....................... 362/501 |
| 5,343,367 | 8/1994 | Davenport et al. . |
| 5,410,454 | 4/1995 | Murase et al. . |
| 5,584,556 | 12/1996 | Yokoyama et al. . |
| 5,590,945 | 1/1997 | Simms . |
| 5,613,751 | 3/1997 | Parker et al. . |
| 5,618,096 | 4/1997 | Parker et al. . |
| 5,668,913 | 9/1997 | Tai et al. . |
| 5,791,756 | 8/1998 | Hulse et al. . |
| 5,812,714 | 9/1998 | Hulse . |

OTHER PUBLICATIONS

Hulse et al., "Analysis of Waveguide Geometries at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, Feb.

*Primary Examiner*—Stephen Husar
*Attorney, Agent, or Firm*—Reising, Ethington, Barnes, Kisselle, Learman & McCulloch, P.C.

[57] ABSTRACT

An illuminated door handle for a vehicle includes a handle having an inside surface in which a channel is defined. A handle waveguide that releases light along its length is positioned in the channel.

27 Claims, 11 Drawing Sheets

ILLUMINATED DOOR HANDLE FOR A VEHICLE

CROSS REFERENCE TO RELATED APPLICATIONS

This application is a C.I.P. of Ser. No. 09/062,766, "OPTICAL WAVEGUIDE STRUCTURES FOR VEHICLE LIGHTING," filed Apr. 20, 1998 and is related to U.S. Pat. No. 5,812,714, "OPTICAL WAVEGUIDE ELEMENTS FOR A DISTRIBUTED LIGHTING SYSTEM," both of which are incorporated by reference.

BACKGROUND

The invention relates to an illuminated door handle that includes a distributed lighting system.

Distributed lighting systems distribute light from one or more light sources in central locations to one or more remote locations. A distributed lighting system promises several advantages over conventional lighting techniques, including low power consumption, extended life, heat reduction where the light is emitted, and increased design flexibility.

SUMMARY

In one general aspect, an illuminated door handle for a vehicle includes a handle having an inside surface in which a channel is defined. A handle waveguide is positioned in the channel. The handle waveguide releases light along its length.

Embodiments may include one or more of the following features. A surface of the handle waveguide may be stippled, may have a reflective coating, or may be covered with a reflective material.

The illuminated door handle may include a light source at an end of the handle waveguide. A collector element may be positioned between the light source and the end of the handle waveguide.

The illuminated door handle may have a button positioned in a button well at an end of the handle. The illuminated door handle also may have a light source at an end of the handle waveguide and a collector element positioned between the light source and the end of the handle waveguide. A button well transmission portion may extend from an opposite end of the handle waveguide and may be positioned to output light for illumination of the button well.

The button well transmission portion may include a ring waveguide that is positioned in the button well and at least partially surrounds the button. A surface of the ring waveguide may be stippled, may have a reflective coating, or may be covered with a reflective material.

The button well transmission portion may include a waveguide end portion. The button may include a waveguide port that is positioned to receive light from the waveguide end portion.

The button also may include a slot extending around a periphery of the button. An internal waveguide may receive light from the waveguide port and emit light into the button well through the slot.

The illuminated door handle may include a light source at an end of the handle waveguide, a first collector element positioned between the light source and the end of the handle waveguide, and a second collector element on a side of the light source opposite the handle waveguide. A button well transmission portion may extend from the second collector and may be positioned to output light for illumination of the button well.

The button well transmission portion may include a ring waveguide that is positioned in the button well and at least partially surrounds the button.

The button well transmission portion may include a waveguide end portion. The button may include a waveguide port that is positioned to receive light from the waveguide end portion.

The illuminated door handle may include a light source positioned in the button, and a slot extending around a periphery of the button. The slot may output light from the light source. A waveguide port may be formed in a side of the button to output light from the light source. A button well transmission portion may extend from an end of the handle waveguide and may be positioned to receive light from the light source. The button well transmission portion may include a waveguide ring at least partially surrounding the button or a waveguide end portion that receives light from the waveguide port.

Other features and advantages will be apparent from the following detailed description, including the drawings, and from the claims.

DESCRIPTION

Figure 1:
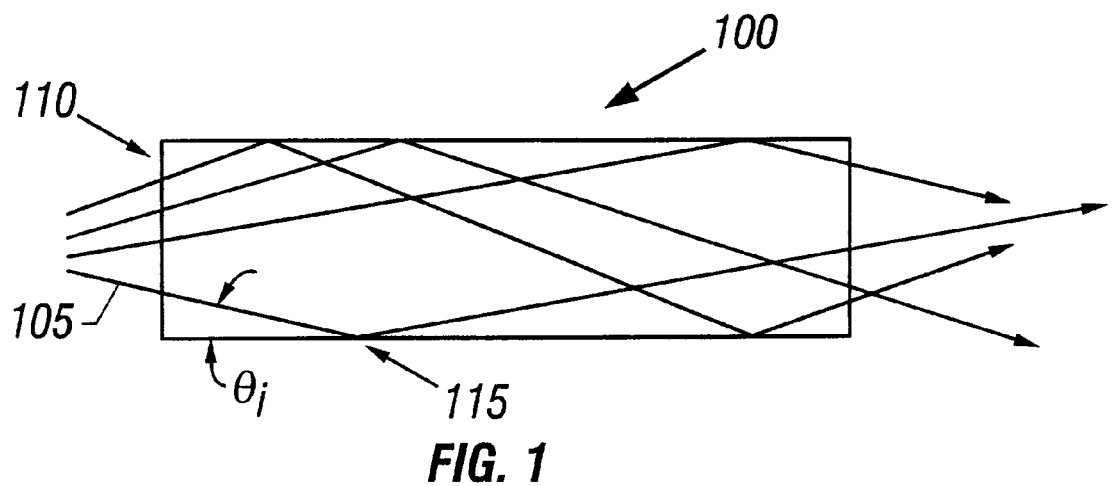
FIG. 1 is a cross-section view of an optical waveguide.

An illuminated door handle for a vehicle may employ a distributed lighting system (DLS) to transmit light from a light source to various lighting output points, such as the inside of the handle and a button well surrounding the button. Different types of waveguide structures may be used in the DLS to transmit light from the light source to the lighting outputs points. A basic waveguide 100, as shown in FIG. 1, may be formed from optically transparent material such as acrylic or glass. If the waveguide 100 is formed from acrylic or a similar material, it can be manufactured using an injection molding process.

As shown in FIG. 1, a light ray 105 entering the input face 110 proceeds through the waveguide 100 until the light ray 105 reaches an outer surface 115 of the waveguide 100, i.e. an interface between the material of the waveguide 100 and air. At the outer surface 115, light is reflected in accordance with Snell's law. If the angle of incidence ($\theta_i$) of the light ray 105 at the outer surface 115 is less than a threshold referred to as the critical angle ($\theta_c$), then the light ray 105 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8$$

where $n_a$ is the index of refraction of air (1.0) and $n_b$ is the index of refraction of acrylic (1.5).

Figure 2A:
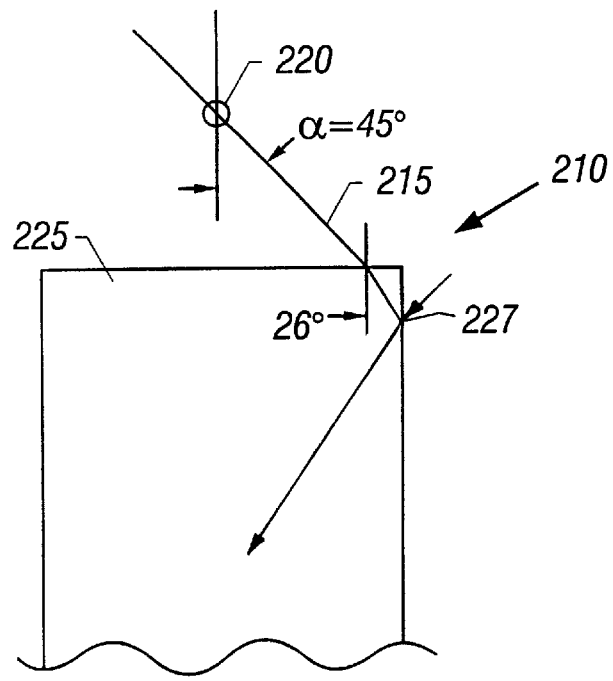
FIGS. 2A–2B are cross-section views of non-tapered and tapered waveguide ends.
Figure 2B:
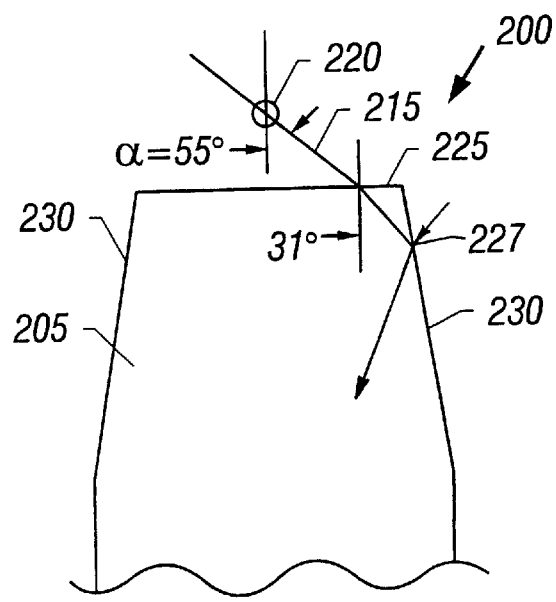

As shown in FIGS. 2A–2B, a waveguide 200 may have a pinched end that acts as a collector element 205. The collector element 205 increases the acceptance angle ($\alpha$) of the waveguide 200 and thereby increases light collection efficiency. The end of the waveguide 200 may be pinched in two dimensions to form an essentially trapezoidally shaped collector element 205. The collector element 205 may be formed on the end of a waveguide 200 having a cross-section that is rectangular, round, or other shapes.

For example, FIG. 2A shows a waveguide 210 without a pinched end. Light 215 from a light source 220 enters the waveguide 210 at an angle of 45°. At the input face 225, the light is bent in accordance with Snell's Law to form an angle of 26° with respect to a direction perpendicular to the input face 225. The light reaches the outer edge 227 of the waveguide at an angle of 26° and is confined within the waveguide by internal reflection.

FIG. 2B shows a waveguide 200 with a pinched end. Light enters the input face at an angle of 55°. Hence, the acceptance angle of the pinched waveguide 200 can be made greater than the acceptance angle of the waveguide 210 without the pinched end. At the input face 225, the light is bent to form an angle of 31° with respect to a direction perpendicular to the input face 225. The light reaches the outer edge 227 of the waveguide at an angle of 26° (since the inclined walls 230 of the pinched portion are angled inward by 5°) and is confined within the waveguide by internal reflection.

Figure 3:
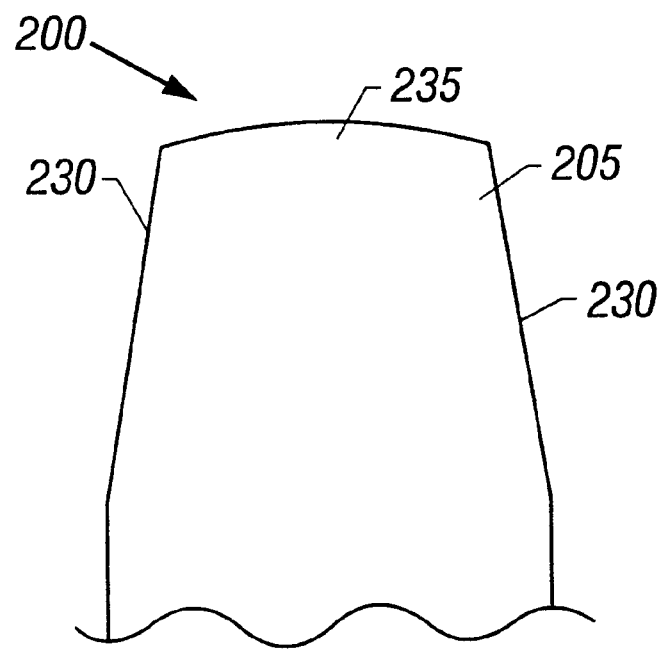
FIG. 3 is a cross-section view of a tapered waveguide end with a lens formed on the tip.

As shown in FIG. 3, the pinched end of the waveguide 200 may be formed so that an excess of material at the tip of the waveguide 200 bulges outward to form a lens 235 with a desired focal length. The lens 235 focuses received light, further increasing the acceptance angle of the waveguide 200.

Figure 4:
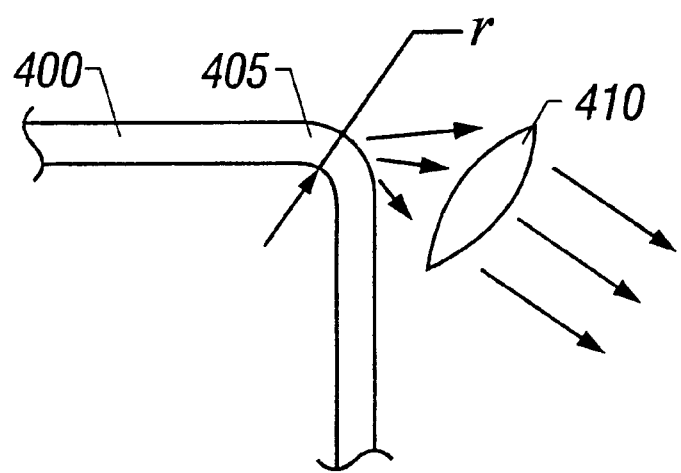
FIG. 4 shows a leaky waveguide bend and focusing lens.

A configuration for a waveguide output element is shown in FIG. 4. A waveguide 400 has a bend 405 that is configured to allow a portion of the light travelling in the waveguide to escape at the bend 405. A lens 410 may be used to focus the light to form a desired beam pattern. The amount of light released at the bend 405 (or reflected back toward the input) can be controlled by determining the inner radius (r) of curvature of the bend 405 relative to the width (w) of the waveguide 400. For example, a bend with a inner bend radius to waveguide width ratio (r/w) of 3:1 will result in a loss of less than 5% of the total light in the waveguide (the losses including light released at the bend and light reflected back toward the input). A bend ratio of 1:1 will result in a loss of approximately 30–35%, and a bend ratio of 0.1:1 will result in a loss of approximately 65–70%. Not all of the light lost in the waveguide enters the lens, however the amount of light entering the lens will be proportional to the amount of light released at the bend.

Waveguide structures in a DLS may carry light from centralized light sources to various output points in the interior of the vehicle to provide, for example, dashboard lighting, dome lights, and reading lights. Waveguides also provide unique, aesthetically pleasing lighting effects for certain interior structures, such as cup holders, map pockets, assist grips, and door handles.

Figure 5A:
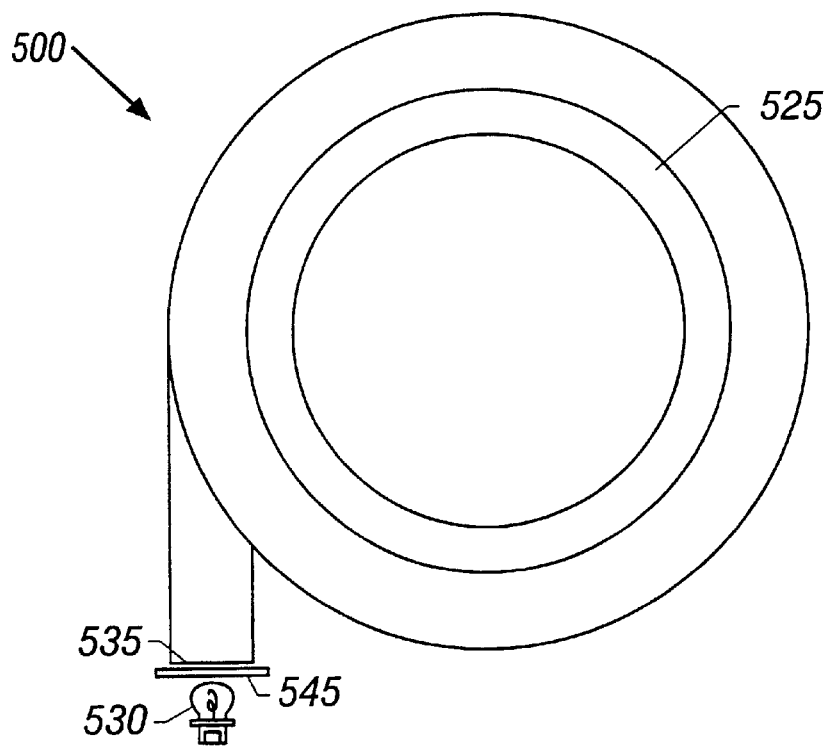
FIGS. 5A–5E show various embodiments of a cup holder illumination component.
Figure 5B:
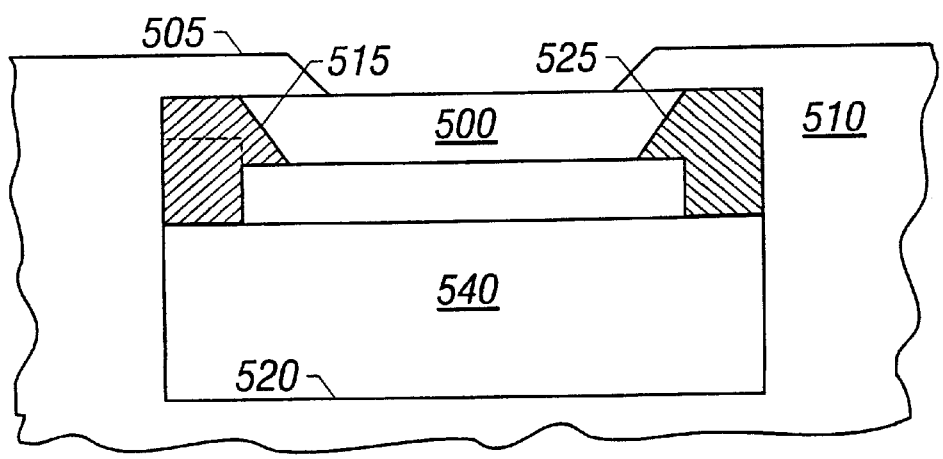

For example, as shown in FIGS. 5A and 5B, a ring-shaped waveguide element 500 may be installed under the lip 505 of a cup holder 510. Although the shape of the waveguide 500 in FIGS. 5A and 5B is circular, any shape may be used depending upon the shape and size of the cup holder 500. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

The waveguide 500 may have a protruding, angled upper region 515 to reflect and/or transmit light downward toward the bottom 520 of the cup holder 510. The upper surface 525 of the angled portion 515 may be stippled and may be covered with a layer of opaque material to prevent leakage of light in the upward direction. A small incandescent bulb 530 at the input 535 of the waveguide is used as a source. A colored filter 545 may be placed between the source 530 and the input 535 to achieve a desired illumination color. When illuminated, the interior 540 of the cup holder 510 glows faintly so as not to interfere with the driver's vision. The glowing illumination allows the occupants of the vehicle to discern the location of the cup holder 510. Light for the waveguide 500 also may be provided by a waveguide 135 connected to one of the lighting subassemblies.

Figure 5C:
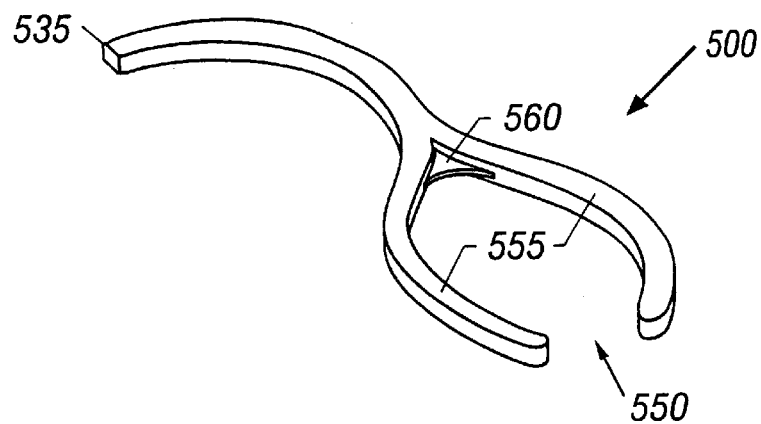
Figure 5D:
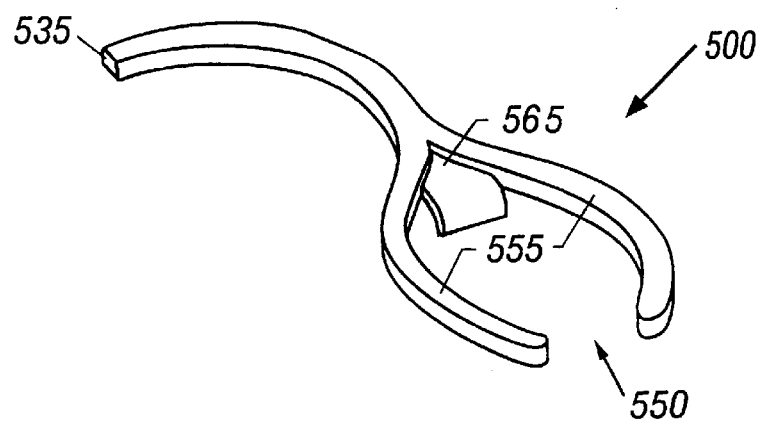
Figure 5E:
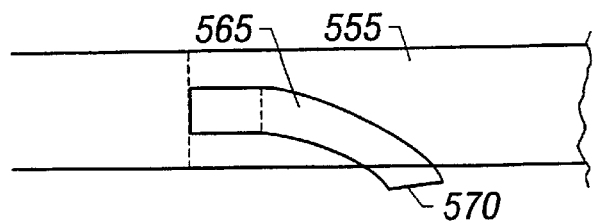

Another embodiment of the cup holder illumination waveguide 500 is shown in FIGS. 5C–5E. These "wishbone" shaped waveguides 500 are configured for cup holders having a gap 550 to accommodate a mug handle. Light for the waveguide 500 enters the input 535 and is split essentially equally to the two arms 555 of the wishbone. The split in the waveguide 500 may lead to a dark area in the illumination of the cup holder. Therefore, as shown in FIG. 5C, a web portion 560 is included between the two arms 555. The web portion is thinner than the rest of the waveguide 500 and provides additional illumination to the portion of the interior 540 of the cup holder directly beneath the split in the wishbone.

Alternatively, as shown in FIG. 5D, a tab 565 that is thinner than the rest of the waveguide 500 may extend downward from the split to reflect and/or transmit light toward the bottom of the cup holder. The tab 565 has a generally rectangular cross-section and curves downward toward the bottom 520 of the cup holder. As shown in FIG. 5E, the tab 565 may have a chamfered leading edge 570.

Figure 6A:
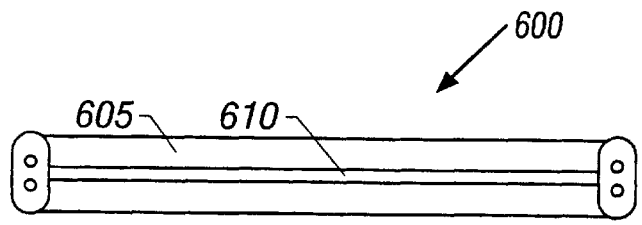
FIG. 6A is a rear view of a waveguide installed in a handgrip.
Figure 6B:
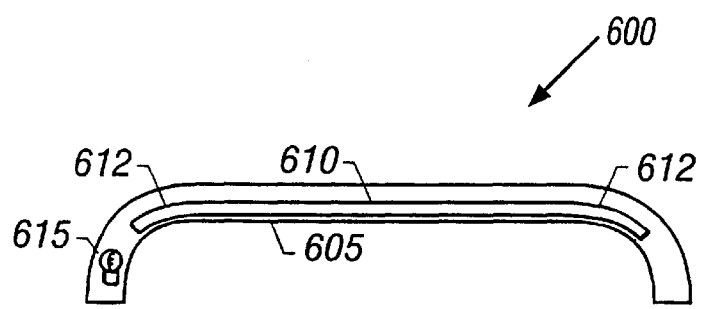
FIG. 6B is a cross-section view of a waveguide and light source installed in a handgrip.
Figure 6C:
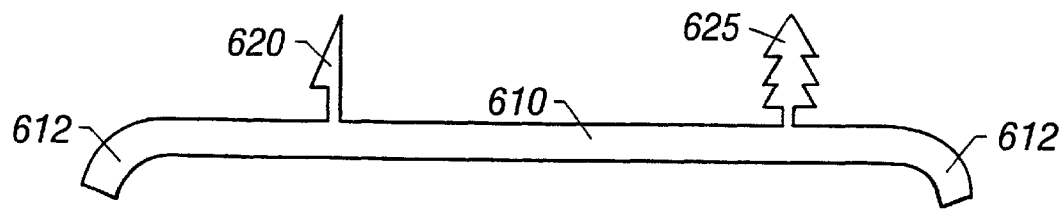
FIG. 6C shows a waveguide with integrated snaps for installation into a handgrip.

Similar structures may be used in the interior of a map pocket or, as shown in FIGS. 6A–6C, along the interior surface 605 of a assist grip 600. A length of waveguide 610 is installed along the inner surface 605. The waveguide includes bends 612 at the ends to conform to the shape of the assist grip. A small incandescent bulb 615 provides a light source. The bulb may be used in conjunction with a lens (not shown) to provide a courtesy light. Alternatively, the assist grip 600 may be connected by a waveguide to another light source in the DLS. As shown in FIG. 6C, the waveguide 610 may be formed with snaps 620 and 625 to make installation into the assist grip 600 easier.

Figure 7:
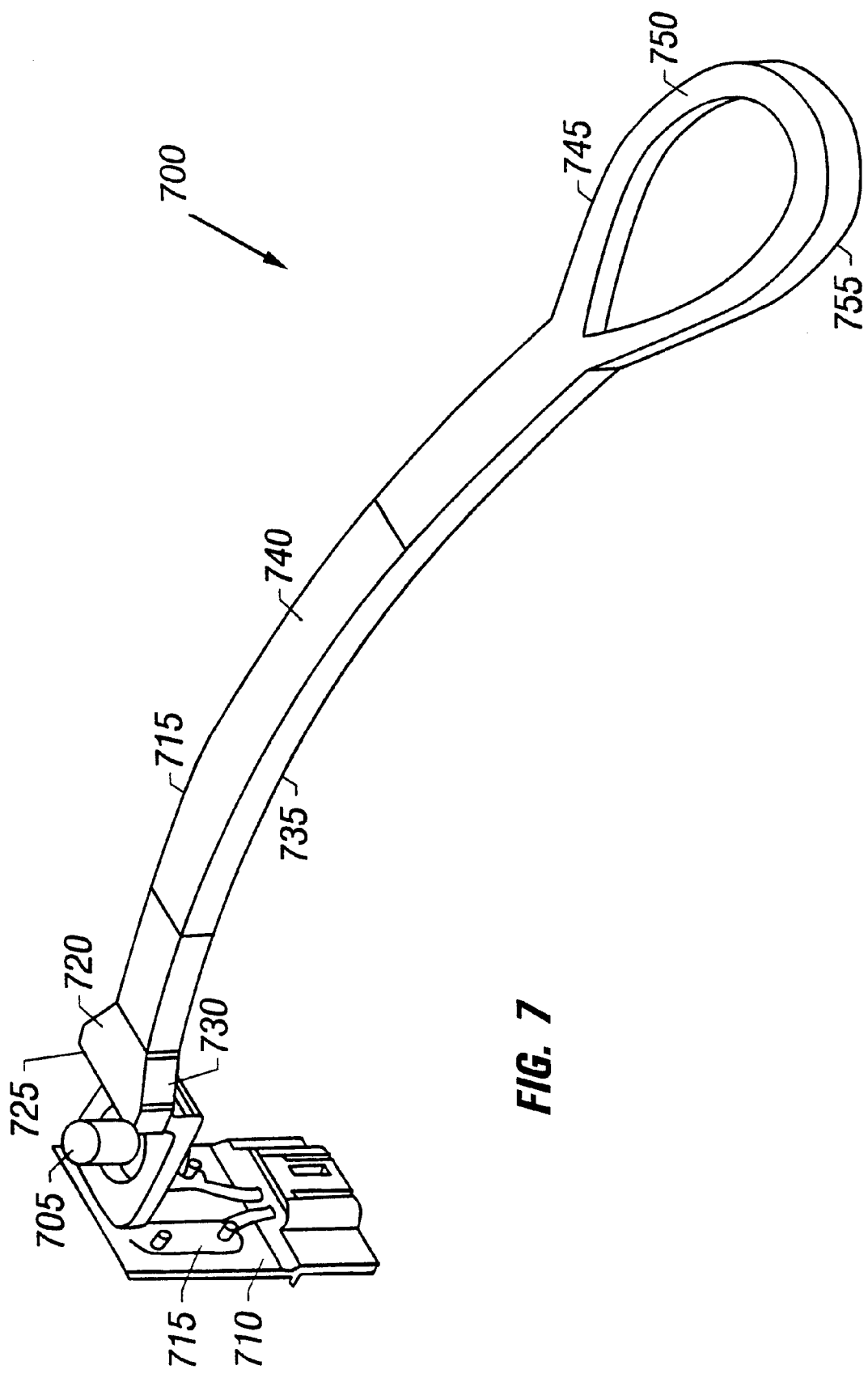
FIG. 7 is a perspective view of a vehicle door handle illumination component with a waveguide ring.

The waveguide structures discussed above may used to provide an illuminated door handle for the exterior of the vehicle. As shown in FIG. 7, an illumination component 700 has a light source 705, such as a small incandescent bulb, mounted in a bracket 710. Electrical power connections 715 for the light source 705 also are mounted on the bracket 710. A handle waveguide 715 having a collector element 720 is connected to the bracket 710 so that the input face 725 of the collector 720 is in proximity to the light source 705. The input face 725 has an area larger than the cross-section of the handle waveguide 715 to increase the amount of light received from the light source 705. The sides 730 of the collector 720 are angled or bevelled so that light entering the input face 725 is reflected internally and enters the handle waveguide 715.

The surfaces 735 and 740 of the handle waveguide 715 may be roughened or stippled to cause light to leak from the bottom surface 735 of the handle waveguide 715 along its length. The top surface 740 may be coated with a reflective coating or material, such as metal foil. A waveguide ring 745 extends from the opposite end of the handle waveguide 715. The surfaces of the waveguide ring also may be roughened or stippled to allow light to leak from the top surface 750 of the ring waveguide 745.

Figure 8:
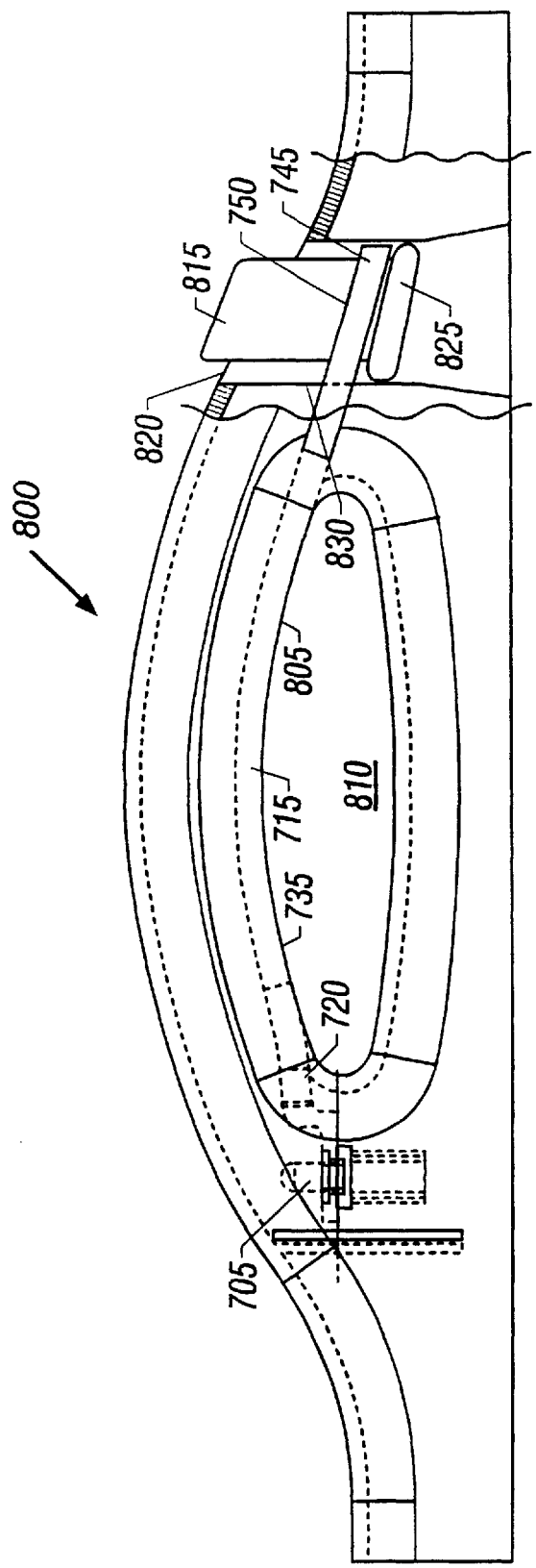
FIG. 8 is a partial cut-away view of an illumination component installed in a vehicle door handle.

Referring to FIG. 8, the illumination component is installed in a vehicle door handle 800. The handle waveguide 715 is positioned in a slot or channel along the inside surface 805 of the handle and releases light along the bottom surface 735 of the waveguide, as discussed above, to illuminate the inside 810 of the door handle.

A button 815 is positioned in a well 820 at one end of the handle 800. The waveguide ring 745 surrounds the button 815 to provide illumination of the button 815 and well 820. However, the waveguide ring 745 does not need to completely surround the button (i.e., the ring may have a gap). A lip portion 825 along the bottom rim of the button 815 reflects light out of the well 820 to improve efficiency and the aesthetic characteristics of the illumination pattern.

Referring again to FIG. 7, the waveguide ring 745 may use several mechanisms to release light in the well 820. For example, the bottom surface 755 of the ring may be stippled or roughened in a manner similar to the cup holder illuminator (FIGS. 5A–5E) so that light is reflected out of the well 820. The bottom surface also may coated with a reflective coating or a reflective material, such as a metal foil. The walls 830 of the well 820 also may have a reflective coating.

In addition, the ring 745 may have an inner bend radius to waveguide width ratio (r/w) of 1:1 or less, which will result in light leakage along the circumference of the ring. The light that escapes from the ring will illuminate the well 820 and button 815 and will be reflected by the lip portion 825 of the button 815 or by the walls 830 of the well 820. The ring 745 may include a web portion or tab, as shown in FIGS. 5A–5F, to improve the illumination pattern of the ring.

Figure 9:
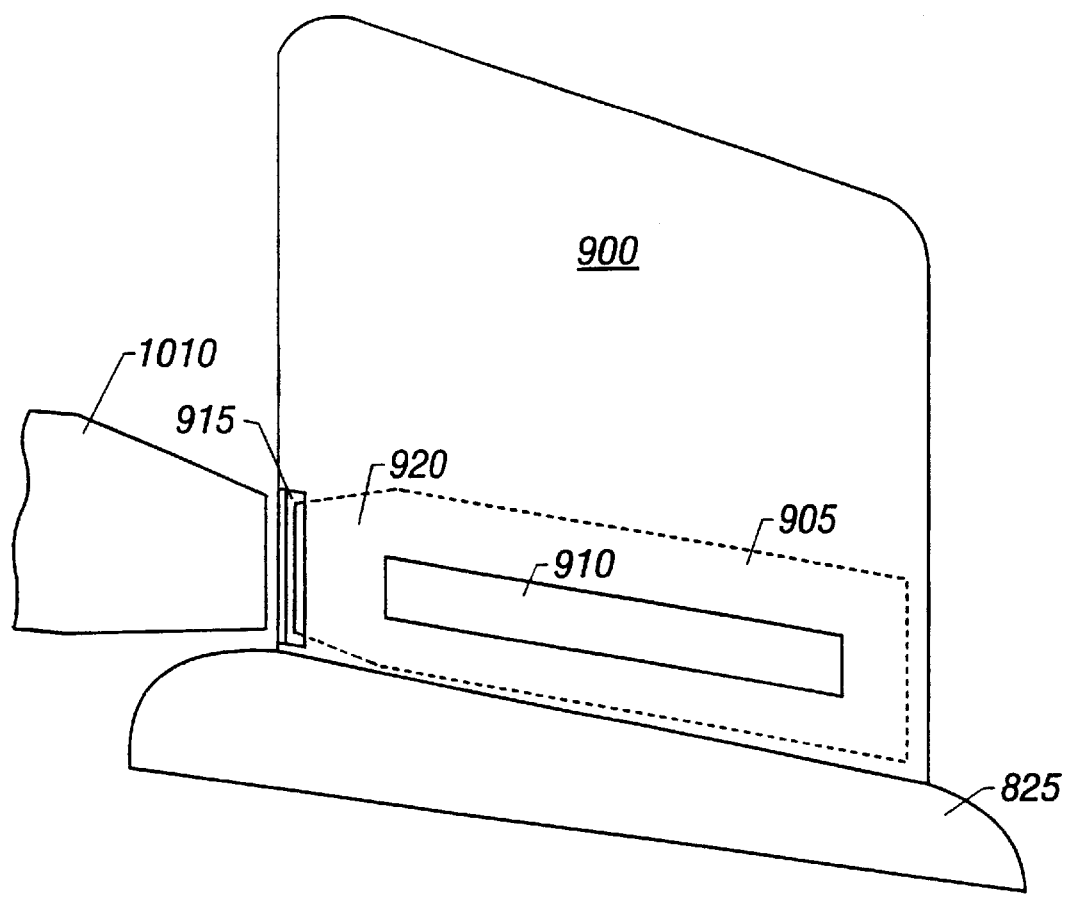
FIG. 9 is a button for a vehicle door handle having an internal waveguide.

Alternatively, the button 900, as shown in FIG. 9, may have a disk or ring-shaped internal waveguide 905 positioned along the inner circumference of the button 900. The internal waveguide 905 releases light through slots 910 in the sides of the button 900. The button 900 also has a waveguide port 915 through which light can be received from a waveguide end portion 1010 of the handle waveguide 715.

Figure 10:
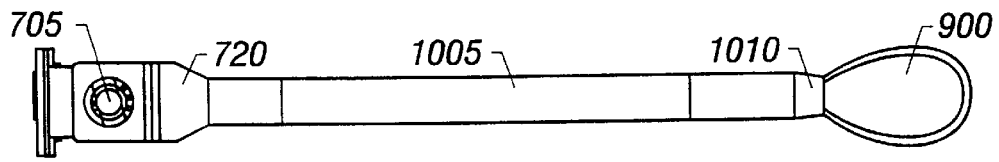
FIG. 10 is a vehicle door handle illumination component with a waveguide end portion.

The handle waveguide 1005 shown in FIG. 10 is similar to the one discussed with respect to FIGS. 7 and 8, except that it has a waveguide end portion 1010 rather than a waveguide ring 745. The end portion 1010 may have a pinched end, as discussed above with respect to FIG. 3, to improve the efficiency with which it delivers light to the interior of the button 900. Likewise, the input portion 920 of the interior waveguide 905 also may have a pinched end (FIG. 9). As in FIG. 8, the handle waveguide is positioned in a slot or channel to illuminate the inside portion of the handle.

Figure 11:
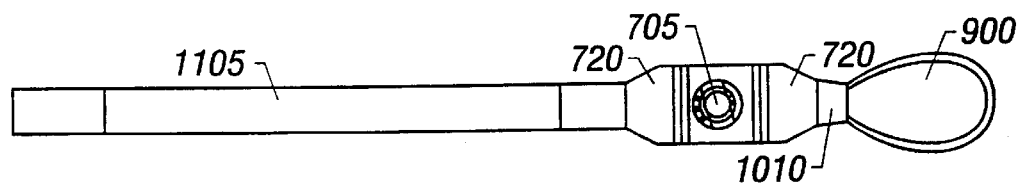
FIG. 11 is an alternative configuration of a vehicle door handle illumination component with a waveguide end portion.
Figure 12:
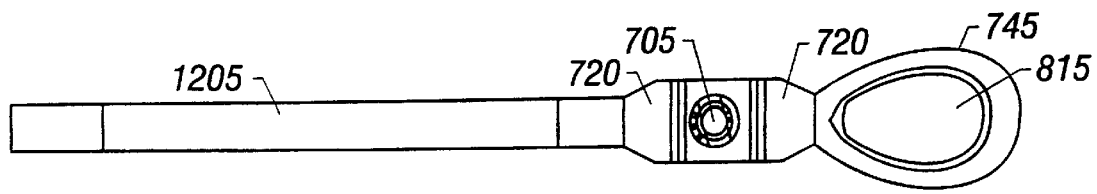
FIG. 12 is an alternative configuration of a vehicle door handle illumination component with a waveguide ring.

As shown in FIG. 11, the handle waveguide 1105 may have a light source 705 at the end nearest the button 900, i.e., between the handle waveguide and the button. In this configuration, both the handle waveguide 1105 and the end portion 1010 have collector elements 720 positioned in proximity to the light source 705. As shown in FIG. 12, the configuration in which the light source 705 is positioned between the handle waveguide 1205 and the button 815 also may be used with a waveguide ring 745, which is discussed above with respect to FIGS. 7 and 8.

Figure 13:
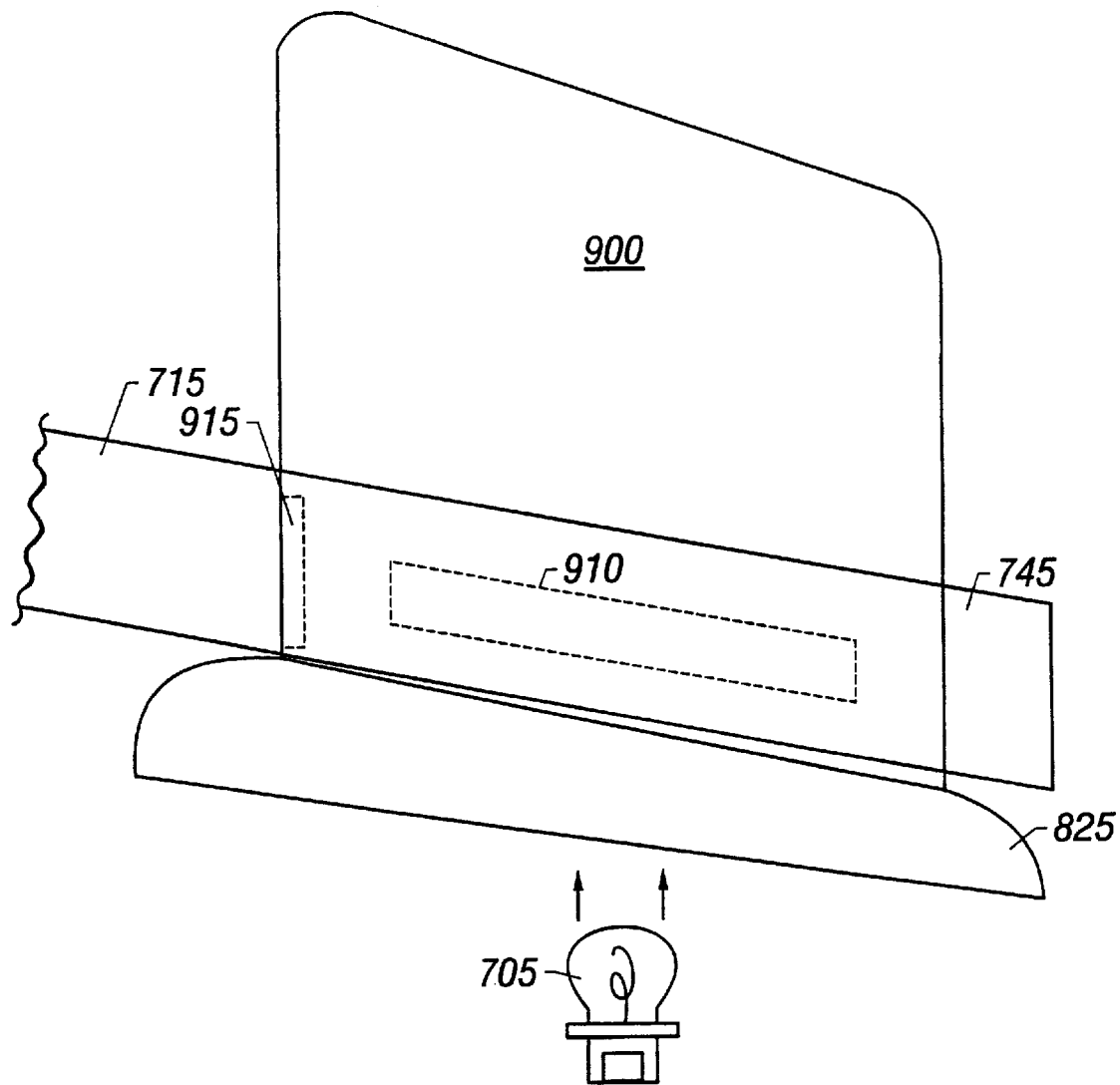
FIG. 13 is a button for a vehicle door handle having an internal light source.

In an alternative configuration, as shown in FIG. 13, a light source 705 may be positioned within the button 900. Light from the light source 705 is output through slots 910 around the circumference of the button 900. A waveguide ring 745 may be positioned around the button 900 to receive the light from the slots 910 and distribute and reflect the light as discussed above with respect to FIG. 7. Light also may exit the button 900 through a waveguide port 915. Light from the waveguide port 915 is received by a handle waveguide 715, which extends from the ring portion as shown in FIG. 7.

The light source 705 may be installed in the button 900 in a configuration that does not include a ring waveguide. Light is output from the button 900 through slots 910 and is reflected by the walls 830 of the well 820 and by the lip portion 825 of the button 900. Light also may be output through the waveguide port 915 and may be received by a handle waveguide 1005 in a manner similar to that shown in FIG. 9.

Other embodiments are within the scope of the following claims.

What is claimed is:

1. An illuminated door handle for a vehicle comprising:
   a handle having an inside surface in which a channel is defined, and
   a handle waveguide positioned in the channel of the inside surface, the handle waveguide being configured to release light along a length of the handle waveguide.

2. The illuminated door handle of claim 1, wherein a surface of the handle waveguide is stippled.

3. The illuminated door handle of claim 1, wherein a surface of the handle waveguide has a reflective coating.

4. The illuminated door handle of claim 1, wherein a surface of the handle waveguide is covered with a reflective material.

5. The illuminated door handle of claim 1, further comprising:
   a light source at an end of the handle waveguide, and
   a collector element positioned between the light source and the end of the handle waveguide.

6. The illuminated door handle of claim 1, further comprising a button positioned in a button well at an end of the handle.

7. The illuminated door handle of claim 6, further comprising:
   a light source at an end of the handle waveguide,
   a collector element positioned between the light source and the end of the handle waveguide, and
   a button well transmission portion extending from an opposite end of the handle waveguide and being positioned to output light for illumination of the button well.

8. The illuminated door handle of claim 7, wherein the button well transmission portion comprises a ring waveguide positioned in the button well and at least partially surrounding the button.

9. The illuminated door handle of claim 8, wherein a surface of the ring waveguide is stippled.

10. The illuminated door handle of claim 8, wherein a surface of the ring waveguide has a reflective coating.

11. The illuminated door handle of claim 8, wherein a surface of the ring waveguide is covered with a reflective material.

12. The illuminated door handle of claim 7, wherein the button well transmission portion comprises a waveguide end portion and the button comprises a waveguide port that is positioned to receive light from the waveguide end portion.

13. The illuminated door handle of claim 12, wherein the button further comprises:

a slot extending around a periphery of the button, and an internal waveguide positioned to receive light from the waveguide port and emit light into the button well through the slot.

14. The illuminated door handle of claim 6, further comprising:

a light source at an end of the handle waveguide, a first collector element positioned between the light source and the end of the handle waveguide, a second collector element on a side of the light source opposite to the handle waveguide, and a button well transmission portion extending from the second collector and being positioned to output light for illumination of the button well.

15. The illuminated door handle of claim 14, wherein the button well transmission portion comprises a ring waveguide positioned in the button well and at least partially surrounding the button.

16. The illuminated door handle of claim 15, wherein a surface of the ring waveguide is stippled.

17. The illuminated door handle of claim 15, wherein a surface of the ring waveguide has a reflective coating.

18. The illuminated door handle of claim 15, wherein a surface of the ring waveguide is covered with a reflective material.

19. The illuminated door handle of claim 14, wherein the button well transmission portion comprises a waveguide end portion and the button comprises a waveguide port that is positioned to receive light from the waveguide end portion.

20. The illuminated door handle of claim 19, wherein the button further comprises:

a slot extending around a periphery of the button, and an internal waveguide positioned to receive light from the waveguide port and emit light into the button well through the slot.

21. The illuminated door handle of claim 6, further comprising:

a light source positioned in the button, and a slot extending around a periphery of the button, the slot being positioned to output light from the light source.

22. The illuminated door handle of claim 21, further comprising:

a waveguide port formed in a side of the button, the waveguide port being positioned to output light from the light source, and a button well transmission portion extending from an end of the handle waveguide and being positioned to receive light from the light source.

23. The illuminated door handle of claim 22, wherein the button well transmission portion comprises a ring waveguide positioned in the button well and at least partially surrounding the button.

24. The illuminated door handle of claim 23, wherein a surface of the ring waveguide is stippled.

25. The illuminated door handle of claim 23, wherein a surface of the ring waveguide has a reflective coating.

26. The illuminated door handle of claim 23, wherein a surface of the ring waveguide is covered with a reflective material.

27. The illuminated door handle of claim 22, wherein the button well transmission portion comprises a waveguide end portion that is positioned to receive light from the waveguide port.

* * * * *